(12) United States Patent
Jabr

(10) Patent No.: US 6,229,632 B1
(45) Date of Patent: May 8, 2001

(54) BROADBAND OPTICAL TRANSMISSION SYSTEM UTILIZING DIFFERENTIAL WAVELENGTH MODULATION

(75) Inventor: Salim Jabr, Mountain View, CA (US)

(73) Assignee: Ditech Corporation, Mountain View, CA (US)

( * ) Notice: Subject to any disclaimer, the term of this patent is extended or adjusted under 35 U.S.C. 154(b) by 0 days.

(21) Appl. No.: 08/854,536

(22) Filed: May 12, 1997

(51) Int. Cl.$^7$ .............................. H04B 10/08; G02B 6/02
(52) U.S. Cl. ..................... 359/124; 359/124; 359/182; 359/180; 359/123
(58) Field of Search .................................... 359/182, 123, 359/181, 180, 188, 191, 161, 124; 385/4

(56) References Cited

U.S. PATENT DOCUMENTS

| | | |
|---|---|---|
| 4,992,754 | 2/1991 | Blauvelt ........................... 330/149 |
| 5,170,273 | * 12/1992 | Nishio ............................. 359/128 |
| 5,491,576 | * 2/1996 | Bergano ........................... 359/156 |
| 5,543,952 | * 8/1996 | Yonenaga et al. .................. 359/181 |

* cited by examiner

*Primary Examiner*—Jason Chan
*Assistant Examiner*—Agustin Bello
(74) *Attorney, Agent, or Firm*—Steven F. Caserza; Flehr Hohbach Test Albritton & Herbert LLP

(57) ABSTRACT

A differential method of improving the carrier to noise ratio of optically transmitted amplitude modulated signals without affecting the fidelity of the transmitted signals is disclosed. The disclosed method improves over prior art methods by utilizing a single transmission fiber transmitting two wavelengths that are modulated out of phase by a single Mach Zehnder type modulator. The received light is separated into two components at two wavelengths and each wavelength is received by a photodetector. The two photodetector outputs are differentially combined to produce an output with improved signal to noise ratio resulting in improved bit error rates in digital transmissions. The invention is also useful in fiber optic analog transmission systems such as those used to distribute AM-VSB Cable Television programming, wherein the differential method improves the carrier to noise ratio without increasing the nonlinear components in the signal.

22 Claims, 1 Drawing Sheet

BROADBAND OPTICAL TRANSMISSION SYSTEM UTILIZING DIFFERENTIAL WAVELENGTH MODULATION

FIELD OF THE INVENTION

This invention relates to communication systems that transmit information over an optical fiber cable. More specifically this invention pertains to a method of improving the carrier to noise ratio of analog video transmission without impacting the linearity and fidelity of the transmission.

PRIOR ART

The need for communication bandwidth capacity has increased dramatically in the last decade and continues on an exponential growth path. It is forecast that the bandwidth requirements of telecommunication systems will increase by a factor of 400 (IEEE Spectrum, January 1995) when most of the personal computers in businesses and homes are connected over telephone networks. To fill this need communications companies have invested large sums into developing infrastructures to transmit all this information. One of the various methods of transmitting large quantities of information that has experienced much growth in the last decade utilizes optical fibers and transmits information in the form of modulated light through these fibers.

Optical fiber transmission systems fall into two categories: analog and digital systems. In analog transmission systems the amplitude of the light in the fiber directly represents the amplitude of the transmitted analog signal. The fidelity and linearity of all the components of such an analog system, such as the transmitter, receiver and any amplifiers in-between is of critical importance to the proper transmission of the signal. The transmitter usually consists of a laser and two options are available to modulate its output: direct modulation of the current through the laser or external modulation via an additional light modulator. Both techniques have been practiced and each suffers from particular drawbacks.

Lasers tend to have nonlinear current to output relationship and external modulators have a sinusoidal input output curve. It follows that in either modulation type the amplitude of the modulation must be kept low in order to maintain the linearity of the transmitter within the required system performance range. A direct result of the low modulation ratio is a low signal to noise ratio, thus severely impairing the operation range of the system.

As an example the Carrier to Noise Ratio (CNR) in Community Antenna Tele-Vision (CATV) distribution networks is required to be higher than 50 dB for proper reception. In such systems, up to 80 or more RF carrier channels are summed and transmitted over one light transmitter. The mixing of all the analog carriers due to nonlinearities in the system leads to the formation of second order and third order mixing terms in the frequency spectrum, referred to as second order and triple beat terms. The sum total of all the power in the second order terms is referred to as Composite Second Order (CSO), and the sum of all the power in the triple beats as Composite Triple Beat (CTB). These quantities are required to be 65 to 70 dB below the carrier power. In order to satisfy these requirements the optical modulation index (OMI), which is defined as the peak to peak modulation amplitude divided by the average light power, must be kept below 4 or 5% per carrier. As a result, the CNR at the transmitter is on the order of 55 dB and degrades from that value when the signal goes through amplifiers.

In order to improve the CNR while keeping nonlinearities low several approaches have been taken in the prior art. A first approach pre-distorts the electrical input to a Mach Zehnder optical modulator or to a directly modulated laser as in U.S. Pat. No. 4,992,754. Such pre-distortion linearized modulators are now commercially available from for example Uniphase Telecommunications Products in Bloomfield Conn. (model APE CATV). A second approach applies specific ratios of RF power to two modulators arranged optically in tandem as described by H. Skeie and R. Johnson in "Linearization of Electro-Optic Modulators By a Cascade Coupling of Phase Modulating Electrodes", SPIE Vol. 1583, p. 153 (1991).

As mentioned above, in an optical analog vestigial sideband (AM-VSB) transmission system, it is desireable to increase the level of optical modulation per channel at the transmitter in order to achieve the highest carrier to noise ratio at the receiver. All the above methods suffer from limitations on the linearity that allow only a maximum of 4 to 5% modulation per TV channel RF carrier, before the CSO and CTB distortions start exceeding the required levels.

More recently, in the Optical Fiber Communications Conference Technical Digest, paper WN2, p. 196 (1996), Kuo et. al. described a differential detection approach to improving the CNR of an optical transmission by 3 dB. As described in FIG. 1 of this disclosure, Kuo's approach requires two transmission fibers 10 and 10', one for each output of the Mach Zehnder optical modulator 5.

The present invention aims to improve the CNR level without increasing the CSO and CTB and to use a single transmission fiber instead of two.

Furthermore in the optical transmission of digital signals, the ratio of the difference between the peak light power in the fiber, representing a 1 (one), and the minimum light power representing a 0 (zero), to the noise power directly affects the bit error rate of the transmission. The present invention can also serve to maximize this ratio and thus minimize the bit error rate.

SUMMARY OF THE INVENTION

Therefore this invention provides a method for improving the Carrier to Noise Ratio (CNR) of an analog transmission over optical fiber without increasing the nonlinear distortions such as Composite Second Order (CSO) and Composite Triple Beats(CTB) and without using more than one transmission fiber. This invention achieves this objective by utilizing two light wavelengths modulated by a single Mach Zehnder type optical modulator having two fiber outputs. At the first output fiber, the first wavelength is filtered out and at the second fiber output, the second wavelength is filtered out. Since the Mach Zehnder outputs are necessarily in phase opposition, said first wavelength light increases at said first fiber output by substantially the same amount that said second wavelength light decreases at said second fiber output. The two fiber outputs of said Mach Zehnder modulator are then re-combined into a single mode fiber for transmission. At the other end of the said transmission fiber, the said first and second wavelengths are separated into a first and second optical detectors by means of a wavelength demultiplexer. Thus the electrical output of the first detector is proportional to the power of the first wavelength light and the output of the second detector is proportional to the wavelength of the second wavelength light. By virtue of those said first and second light powers being equal in amplitude and opposite in phase, when the electrical outputs are summed in an RF combiner, the electrical signal output of the combiner is twice as high as any of the said first and second outputs of the detectors. Accordingly the optical modulation index of the transmitted light appears to have been doubled, resulting in a 3 dB increase in CNR. This is achieved without actually increasing the OMI at the Mach Zehnder and causing an increase in the nonlinear distortions such as CSO and CTB. Further any correlated electrical noise that is common mode to both detectors, such noise possibly originating from the transmitter, is eliminated by the combiner. A further improvement utilizes four detectors, two for each of the said wavelengths. The method of this invention can equally as well be applied to digital transmission where it enhances the signal to noise ratio at the receiver.

DETAILED DESCRIPTION OF THE DRAWINGS

DETAILED DESCRIPTION OF THE PREFERRED EMBODIMENT

Figure 1:
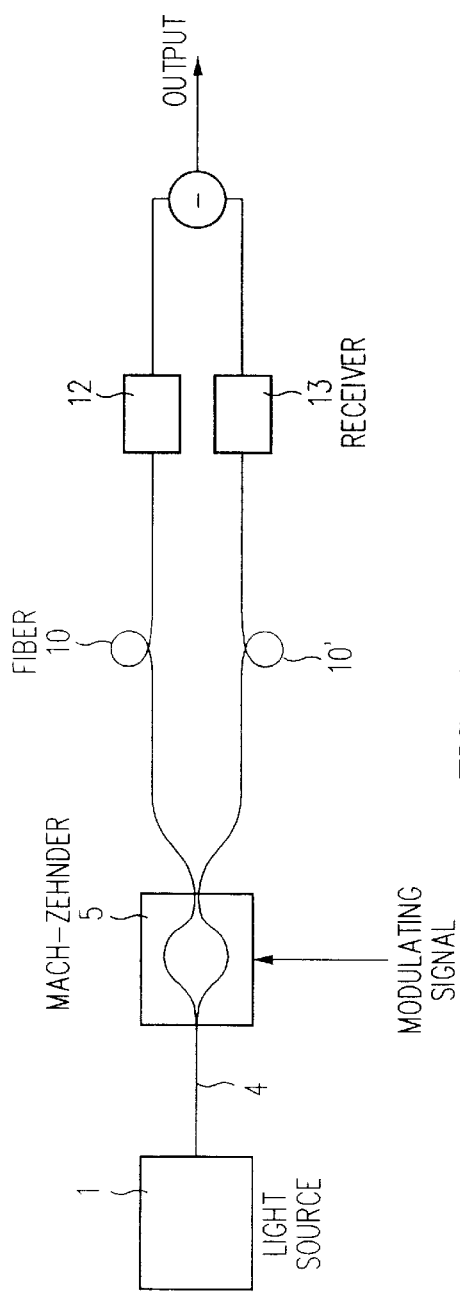
FIG. 1 is a description of the prior art.
Figure 2:
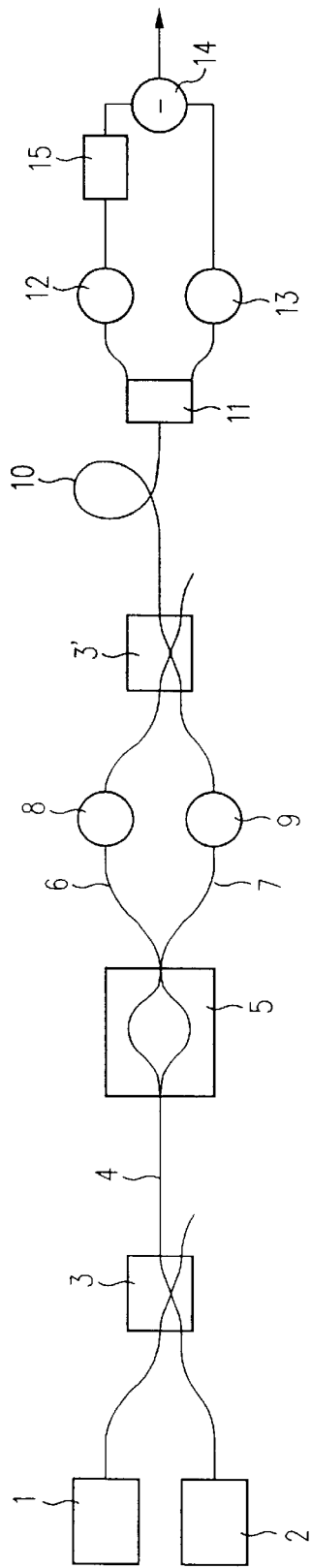
FIG. 2 is a representation of a preferred embodiment of the present invention.

Referring to FIG. 2, the outputs of a first laser 1 having wavelength W1 and a second laser 2 having wavelength W2, are combined into a single fiber 4 by means of an optical coupler 3 (e.g. Gould fused biconic coupler model 44-10355-50). The Fiber 4 is connected to the input of a Mach Zehnder Modulator having two output fibers 6 and 7. The output fiber 6 is connected to the input of a narrow band fiber filter 8 such as a grating or a multilayer dielectric filter whose center wavelength is at a first wavelength W1. The second output fiber 7 is connected to a second filter 9 which transmits at a wavelength W2. The outputs of filters 8 and 9 are coupled together by means of a coupler 3' into the transmission fiber 10. The receive end of the transmission fiber 10 is connected to a wavelength division multiplexer 11, an example of which is the model BWDM1700-31 sold by E-Tek corporation San Jose Calif., which sends the light at wavelength W1 into a first output fiber and the light at W2 into a second output fiber. The first output of wavelength demultiplexer 11 is connected to the input of detector 12. The second output of wavelength division demultiplexer 11 is connect to a second detector 13. The electrical output of detectors 12 and 13 are combined by combiner 14 whose output is the difference in the individual outputs of the two detectors. A delay is provided in the path containing detector 12 to compensate for the propagation delay between the first and second wavelength light, caused by the dispersion of the fiber transmission line. In a first embodiment, electrical delay line 15 is connected between detector 13 and combiner 14. In a second embodiment, an optical delay line is connected between demultiplexer 11 and detector 12.

OPERATION OF THE PREFERRED EMBODIMENT

The light in fiber 4 is comprised of two wavelengths W1 and W2 and both wavelengths are modulated equally by the MZ modulator 5. The two outputs of the MZ modulator are however out of phase i.e. when the light intensity increases at the first output 6 due to an applied electrical signal, the light at output 7 decreases. The output 6 will be in phase with the applied electrical signal while 7 will be out of phase. Hence while W1 and W2 are increasing in 6, W1 and W2 are decreasing in 7. Filter 8 then attenuates out the light at W2 leaving W1 in phase with the electrical signal, and filter 9 attenuates the light at W1 leaving W2 out of phase with the electrical signal. The in-phase light at wavelength W1 and out of phase light at wavelength W2 are now combined by coupler 3' into the transmission fiber 10. At the receive end of the fiber 10 the in phase light at W1 is detected by photo-detector 12 and the out of phase light at W2 is detected by photo-detector 13 and the outputs of the detectors are combined thus producing a twice stronger signal at the output of combiner 14. Either the output of detector 12 or the output of detector 13 may be delayed by a delay line 15 in order to compensate for the fiber dispersion i.e. the difference in propagation speed of the light at the W1 and W2 wavelengths in the transmission fiber 10.

Let $A_1$ be the optical power output from laser source 1, $A_2$ be the output power from laser 2, f(t) be the time dependence of the signal applied to the Mach-Zehnder modulator and m the optical modulation index at the output of the modulator. Let MZ1 and MZ2 be the optical outputs from the outputs 6 and 7 of the modulator. In mathematical form we then have:

$$MZ1=(A_1+A_2)[m \sin\{f(t)\}+1]$$

$$MZ2=(A_1+A_2)[-m \sin\{f(t)\}+1]$$

The output of the coupler is then given by:

$$A_1[m \sin\{f(t)\}+1]+A_2[-m \sin\{f(t)\}+1]$$

and the signal currents in detectors 6 and 7 are:

$$i_6=Ln_1A_1[1+m \sin\{f(t+d_1)\}]$$

$$i_7=Ln_2A_2[1-m \sin\{f(t+d_2+D)\}]$$

where $n_1$ and $n_2$ are the efficiencies of detectors 6 and 7 respectively, L the optical loss between the MZ modulator and the receivers, $d_1$ the fiber delay at wavelength W1, $d_2$ the fiber delay at wavelength W2 and D the delay of the fiber delay line 15. If the delay D is such that $d_1=d_2+D$, the output of the combiner 14 is then:

$$i_6-i_7=L(n_1A_1'-n_2A_2')+Lm (n_1A_1'+n_2A_2') \sin\{f(t+d_1)\}$$

If the two detectors are well balanced $n_1A_1'-n_2A_2'=0$ and $n_1A_1'+n_2A_2'=2n_1A_1'$ hence $i_6-i_7=2Ln_1A_1$ m sin{f(t+d1)}, effectively doubling the modulation index of the signal.

If $i_n$ is the average noise current in either detector then $\sqrt{2}$ $i_n$ is the noise output of the combiner. The signal to noise power ratio at the combiner output is then $$S/N=(i_6-i_7)^2{}_{max}/2i_n{}^2=4m^2i_6{}^2/2i_n{}^2$$

Hence the signal to noise power ratio has been enhanced by a factor of two at the output of the combiner when compared with the output of detector 6.

What is claimed is:

1. An optical transmission system, comprising:

a first laser emitting a light at wavelength W1;

a second laser emitting a light at wavelength W2, different than wavelength W1;

a first coupler having a first input port receiving said light at wavelength W1, a second input port receiving said light at wavelength W2, and an output port transmitting a combined light at wavelength W1 and wavelength W2;

a modulator responding to an applied electrical stimulus, having an input port coupled to said first coupler output port and receiving said combined light, a first modulator output port providing a combined light which is modulated in phase with said electrical stimulus, and a second modulator output port providing a combined light which is modulated in phase opposition to said electrical stimulus;

a first optical filter having an input port coupled to said first modulator output port, and an output port transmitting modulated light at wavelength W1;

a second optical filter having an input port coupled to said second modulator output port, and an output port transmitting modulated light at wavelength W2;

an optical combiner having a first input port coupled to said first optical filter output port, a second input port coupled to said second optical filter output port, and an output port transmitting a combined modulated light at wavelength W1 and wavelength W2;

a first apparatus having an input port coupled to said output port of said optical combiner, a first output port transmitting modulated light at wavelength W1, and a second output port transmitting modulated light at wavelength W2;

a first detector having an input port coupled to said first output port of said first apparatus, and having an output port providing a first electrical output signal;

a second detector having an input port coupled to said second output port of said first apparatus, and having an output port providing a second electrical output signal; and a second apparatus having a first input port coupled to said output port of said first detector, a second input port coupled to said output port of said second detector, and an output port providing the difference between said first electrical output signal and said second electrical output signal.

2. The system of claim 1 wherein said first apparatus comprises a dichroic thin film multi-layer filter.

3. The system of claim 1 wherein said first apparatus comprises a third coupler, a first output of said third coupler having a first filter transmitting at wavelength W1 and a second output of said third coupler having a second filter transmitting at wavelength W2.

4. The system of claim 1 which further comprises an optical delay between said first output port of said first apparatus and said input port of said first detector.

5. The system of claim 1 which further comprises an electrical delay between said output port of said first detector and said input port of said second apparatus.

6. The system of claim 1 wherein said optical combiner comprises a coupler.

7. The system of claim 1 wherein said first apparatus comprises a wavelength division demultiplexer.

8. The system of claim 1 wherein said first laser comprises a continuous wave laser with narrow spectral width and said second laser comprises a continuous wave laser with narrow spectral width.

9. The system of claim 1 wherein said modulator comprises a Mach-Zehnder modulator.

10. The system of claim 1 wherein said second apparatus comprises an electrical differential combiner.

11. The system of claim 1 wherein said optical combiner comprises a wavelength division multiplexer.

12. An optical transmission system, comprising:

a first laser emitting a light at wavelength W1;

a second laser emitting a light at wavelength W2, different than wavelength W1;

a first coupler receiving and combining said light at wavelength W1 and said light at wavelength W2 into a first coupler output port;

a modulator receiving a combined light at wavelength W1 and wavelength W2 from said first coupler output port and modulating said combined light into a first and a second modulator output port, said modulator responding to an applied electrical stimulus, such that said combined light at said first modulator output port varies in phase with said electrical stimulus, and said combined light at said second modulator output port varies in phase opposition to said electrical stimulus;

a first optical filter receiving said light at wavelength W1 and said light at wavelength W2 from a first modulator output port and transmitting said light at wavelength W1 into a first optical filter output port;

a second optical filter receiving a second modulator output signal and transmitting said light at wavelength W2 into a second optical filter output port;

an optical combiner receiving and combining said light at wavelength W1 from said first optical filter output port and said light at wavelength W2 from said second optical filter output port into a transmission line;

a first apparatus separating said light at wavelength W1 from said transmission line into a first output and said light at wavelength W2 from said transmission line into a second output;

a first detector converting said light at wavelength W1 from said first output into a first electrical output;

a second detector converting said light at wavelength W2 from said second output into a second electrical output; and a second apparatus producing the difference between said first electrical output and said second electrical output into a difference producing apparatus output signal.

13. The system of claim 12 wherein said second apparatus comprises an electrical differential combiner.

14. The system of claim 12 wherein said optical combiner comprises a wavelength division multiplexer.

15. The system of claim 12 wherein said first apparatus comprises a dichroic thin film multi-layer filter.

16. The system of claim 12 wherein said first apparatus comprises a third coupler, a first output of said third coupler having a first filter transmitting at wavelength W1 and a second output of said third coupler having a second filter transmitting at wavelength W2.

17. The system of claim 12 which further comprises an optical delay between said first output port of said first apparatus and said input port of said first detector.

18. The system of claim 12 which further comprises an electrical delay between said output port of said first detector and said input port of said second apparatus.

19. The system of claim 12 wherein said optical combiner comprises a coupler.

20. The system of claim 12 wherein said first apparatus comprises a wavelength division demultiplexer.

21. The system of claim 12 wherein said first laser comprises a continuous wave laser with narrow spectral width and said second laser comprises a continuous wave laser with narrow spectral width.

22. The system of claim 12 wherein said modulator comprises a Mach-Zehnder modulator.

* * * * *